United States Patent
Yamada et al.

(10) Patent No.: US 12,078,237 B2
(45) Date of Patent: Sep. 3, 2024

(54) TRANSFER COOLING STRUCTURE OF VEHICLE

(71) Applicant: Mazda Motor Corporation, Hiroshima (JP)

(72) Inventors: Syouta Yamada, Aki-gun (JP);
Masayoshi Enomoto, Aki-gun (JP);
Masato Fukuda, Aki-gun (JP);
Takayuki Takamori, Aki-gun (JP);
Kazuhiro Kageyama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 440 days.

(21) Appl. No.: 17/649,522

(22) Filed: Jan. 31, 2022

(65) Prior Publication Data

US 2022/0307584 A1   Sep. 29, 2022

(30) Foreign Application Priority Data

Mar. 25, 2021  (JP) .................................. 2021-051757

(51) Int. Cl.
*F16H 57/04*     (2010.01)
*B60R 13/08*     (2006.01)
*B62D 25/20*     (2006.01)

(52) U.S. Cl.
CPC ..... *F16H 57/0416* (2013.01); *B60R 13/0861* (2013.01); *B62D 25/20* (2013.01)

(58) Field of Classification Search
CPC ............. F16H 57/0416; F16H 57/0415; F16H 57/0419; F16H 57/0412; F16H 57/04; F16H 2057/02008; F16H 2057/02047; B62D 25/20; B62D 25/2018; B62D 25/08; B60R 13/0861; B60R 13/08; B60R 13/0869; B60R 13/0876
See application file for complete search history.

(56) References Cited

U.S. PATENT DOCUMENTS

| | | | | |
|---|---|---|---|---|
| 5,193,415 | A * | 3/1993 | Massel ................. | F16H 57/031 74/606 R |
| 5,813,491 | A * | 9/1998 | Sato .................... | B62D 25/2072 180/69.1 |
| 6,276,044 | B1 * | 8/2001 | Ragland ............... | F01N 1/24 29/521 |

(Continued)

FOREIGN PATENT DOCUMENTS

JP       2018165522 A    10/2018

*Primary Examiner* — James M Dolak
(74) *Attorney, Agent, or Firm* — Alleman Hall & Tuttle LLP (57) ABSTRACT

A transfer cooling structure of a vehicle is provided, the vehicle including a power source, a transmission, and a transfer device provided with a torque-distribution-control friction clutch, disposed in the order from forward of the vehicle. The structure includes a floor provided to the vehicle and having a tunnel part configured to cover a transmission case of the transmission and a transfer case of the transfer device from above, an insulator attached below the tunnel part to cover the transmission case and the transfer case while having a gap with respect to the transmission case and the transfer case, and a cooling acceleration part provided to the insulator protruding toward the transfer case from the floor side.

17 Claims, 6 Drawing Sheets

(56) References Cited

U.S. PATENT DOCUMENTS

| | | | | |
|---|---|---|---|---|
| 6,663,171 | B2* | 12/2003 | Hashirayama | F01N 13/14 |
| | | | | 296/204 |
| 9,688,153 | B2* | 6/2017 | Yamamoto | B60L 3/0061 |
| 9,925,890 | B2* | 3/2018 | Enning | B60L 50/64 |
| 10,371,247 | B2* | 8/2019 | Chandler | F16H 57/0416 |
| 10,703,304 | B2* | 7/2020 | Chandler | B60R 13/0861 |
| 11,279,417 | B2* | 3/2022 | Sakashita | B62D 25/2036 |
| 11,654,762 | B2* | 5/2023 | Kohara | B60K 6/26 |
| | | | | 180/65.21 |
| 11,835,121 | B2* | 12/2023 | James | F16H 57/0423 |
| 11,919,570 | B2* | 3/2024 | Sato | B60K 1/04 |

* cited by examiner

TRANSFER COOLING STRUCTURE OF VEHICLE

TECHNICAL FIELD

The present disclosure relates to a transfer cooling structure of a vehicle, particularly, a transfer cooling structure applied to a four-wheel-drive vehicle.

BACKGROUND OF THE DISCLOSURE

As four-wheel-drive (4WD) vehicles, so-called FR (front-engine, rear-wheel-drive) based 4WD vehicles in which a drive source (e.g., an engine) supplies a driving force not only to rear wheels but also to front wheels are known. In such an FR-based 4WD vehicle, the drive source and a transmission are disposed at a front part of a vehicle body so that their axes extend in a front-and-rear direction of the vehicle body, and the driving force transmitted from the transmission is sent to the rear wheels (main drive wheels) through a rear-wheel output shaft extending rearwardly via a rear-wheel propeller shaft and a rear-wheel differential gear. In addition, a transfer device which extracts a driving force to be transmitted to front wheels (auxiliary drive wheels) is provided on the rear-wheel output shaft, and the driving force extracted to a front-wheel output shaft of the transfer device is transmitted to the front wheels via a front-wheel propeller shaft extending forwardly and a front-wheel differential gear.

As such a transfer device, it is known that the transfer device is provided, on the rear-wheel output shaft, with a friction clutch for torque distribution control which extracts the driving force for the front wheels, and the driving force extracted by the torque-distribution-control friction clutch is transmitted to the front-wheel output shaft via a chain-type or a gear-type powertrain mechanism.

The 4WD vehicle on which the transfer device is mounted controls engagement of the torque-distribution-control friction clutch so as to distribute the driving force to each of the rear-wheel output shaft and the front-wheel output shaft. At this time, the clutch generates heat by friction. Because of this temperature increase, a power transmission performance decreases, and thus, cooling of the clutch is required.

For example, JP2018-165522A discloses a cooling structure for a front-engine and front-wheel-drive based 4WD vehicle. A powertrain of the vehicle includes a transmission and a transfer device. The cooling structure cools the powertrain by providing a guiding wall part defining a wind passage part extending in an up-and-down direction between an engine and the powertrain so as to guide air taken-in during a travel (traveling air) from below the vehicle, to the wind passage part.

In the transfer device accommodating the torque-distribution-control friction clutch, especially the friction clutch easily generates heat and affects the power transmission performance. Therefore, it is required to blow the traveling air to a part where the torque-distribution-control friction clutch is accommodated, to cool the part. Such a transfer device is desired to increase a cooling performance with a simple configuration.

SUMMARY OF THE DISCLOSURE

The present disclosure is made in view of the above situations, and one purpose thereof is to provide a transfer cooling structure of a vehicle, capable of improving the cooling performance of a transfer device provided with a friction clutch for torque distribution control.

According to one aspect of the present disclosure, a transfer cooling structure of a vehicle is provided, the vehicle including a power source, a transmission, and a transfer device provided with a torque-distribution-control friction clutch, disposed in the order from forward of the vehicle. The structure includes a floor provided to the vehicle and having a tunnel part configured to cover a transmission case of the transmission and a transfer case of the transfer device from above, an insulator attached below the tunnel part to cover the transmission case and the transfer case while having a gap with respect to the transmission case and the transfer case, and a cooling acceleration part provided to the insulator protruding toward the transfer case from the floor side.

According to this structure, the cooling acceleration part increases a flow rate of traveling air which is taken in from forward of the vehicle and flows through between the transmission case and the insulator, and then between the transfer case and the insulator. Therefore, the cooling performance of the transfer device provided with the torque-distribution-control friction clutch is improved. Further, with the simple configuration of changing the shape of the part of the insulator which is provided to reduce noise caused by the transmission and the transfer device, the cooling performance of the transfer device can be improved.

The gap between the insulator, and the transmission case and the transfer case may be the smallest at the cooling acceleration part.

According to this structure, by the gap between the insulator, and the transmission case and the transfer case being the smallest at the cooling acceleration part, the cooling performance of the transfer device can be further improved.

A given member may be provided above the transmission case, and a rectifying cover may be provided at a rear part of the given member.

According to this structure, even when the given member is provided above the transmission case, since the rectifying cover is provided at the rear part of the member, traveling air which flows between the transmission and the given member is rectified to pass through between the transfer case and the cooling acceleration part of the insulator, and thus the transfer device being cooled. Moreover, also when a harness, etc., is disposed rearward of the given member, by providing the rectifying cover to cover the harness, etc., generation of turbulence in the traveling air is suppressed, and the cooling of the transfer device is facilitated.

The power source may include a motor, and the given member may include an inverter.

According to this structure, in a hybrid vehicle including the engine and the motor as the power source, the transfer device can be cooled even when the inverter is disposed above the transmission case. By cooling the transfer device provided with the torque-distribution-control friction clutch, a power transmission performance of the hybrid vehicle can be improved.

A plurality of fins may be provided to outside of the transfer case, and a fin of the plurality of fins provided to an upper part of the transfer case may have a taller height compared to fins of the plurality of fins provided to other parts of the transfer case.

According to this structure, since the fin provided to the upper part of the transfer case is formed to have the taller height compared to the fins provided to the other parts of the transfer case, the surface area of the upper fin becomes larger. Therefore, a heat dissipation effect increases, and the cooling effect of the transfer device provided with the torque-distribution-control friction clutch is enhanced.

The cooling acceleration part may include a substantially U-shaped curved surface extending in a front-and-rear direction of a vehicle body.

The curved surface may curve downwardly in an arc shape from a front end part to a central part of the curved surface in the front-and-rear direction so that the gap with respect to the transfer case is gradually reduced, and curve upwardly in an arc shape from the central part to a rear end part of the curved surface so that the gap with respect to the transfer case is gradually increased.

The curved surface may include at the central part an arc part protruding upwardly in a vehicle-width direction so as to conform to the shape of the insulator protruding upwardly to cover above and left and right sides of the transfer case.

The plurality of fins may extend in a front-and-rear direction of the vehicle and may be provided to an upper part, a lower part, a left part, and a right part of a cylindrical part of a transfer case body of the transfer device. The fins provided to the upper part may extend perpendicular to a vehicle-width direction, and may be formed to have a taller height compared to the fins provided to the lower part, the fins provided to the left part, and the fins provided to the right part.

DETAILED DESCRIPTION OF THE DISCLOSURE

Hereinafter, one embodiment of the present disclosure is described with reference to the accompanying drawings.

Figure 1:
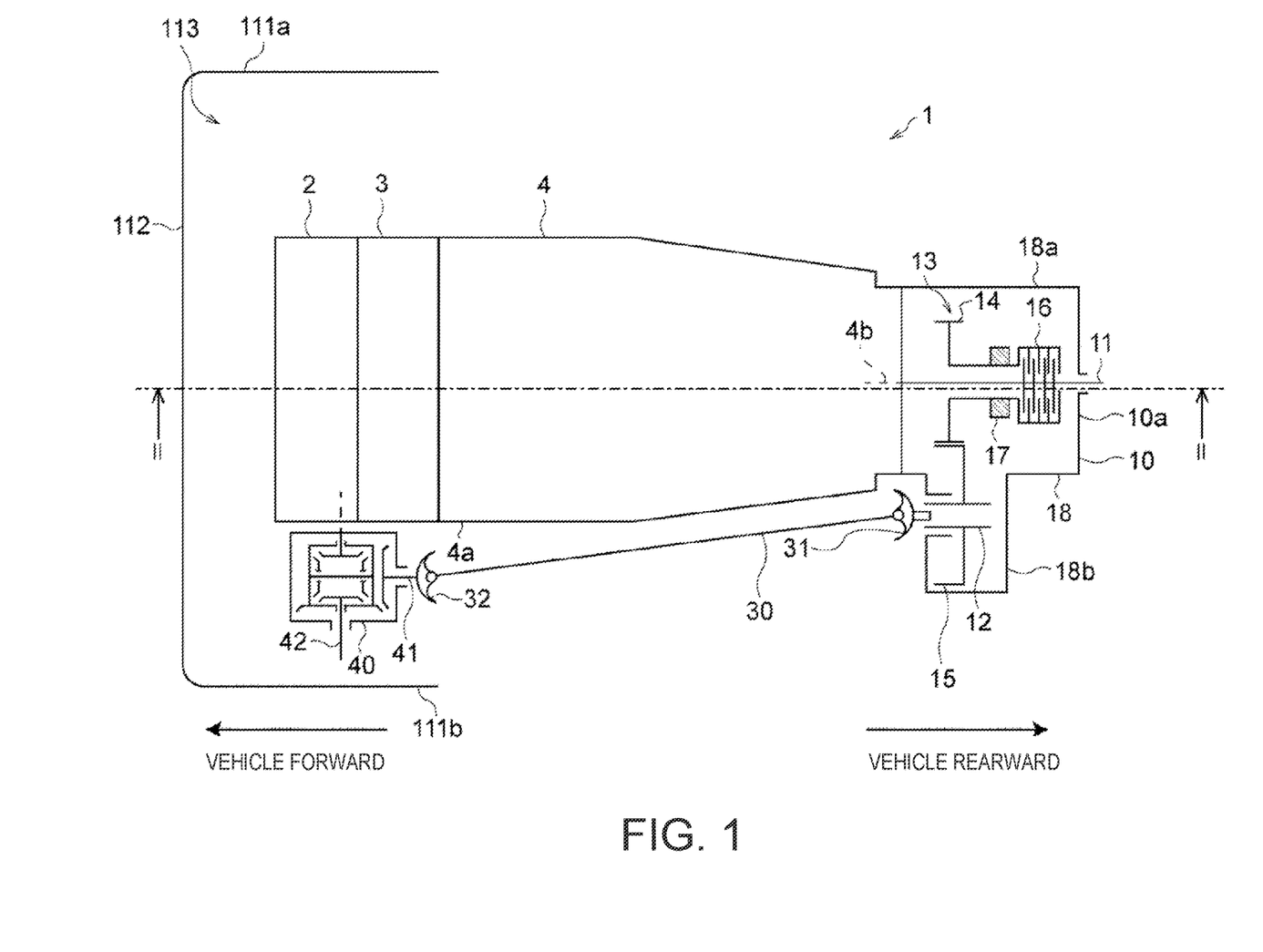
FIG. 1 is a schematic diagram illustrating a powertrain mechanism of a four-wheel-drive (4WD) vehicle on which a transfer device according to one embodiment of the present disclosure is mounted.

FIG. 1 is a schematic diagram illustrating a powertrain mechanism of a four-wheel-drive vehicle on which a transfer device according to this embodiment is mounted. As illustrated in FIG. 1, a four-wheel-drive (4WD) vehicle 1 on which a transfer device according to this embodiment is mounted, is a front-engine rear-wheel-drive (FR) based hybrid 4WD vehicle, and an engine 2 and a motor 3 as drive sources and a transmission 4 are disposed at a front part of a vehicle body so that their axes extend in a front-and-rear direction of the vehicle body.

On the rear side of the transmission 4, a transfer device 10 is provided so as to transmit a driving force sent from the engine 2 and the motor 3 through the transmission 4, to rear wheels (main drive wheels) via a rear-wheel propeller shaft extending rearwardly and a rear-wheel differential gear, as well as to extract a driving force to be transmitted to front wheels (auxiliary drive wheels).

Figure 2:
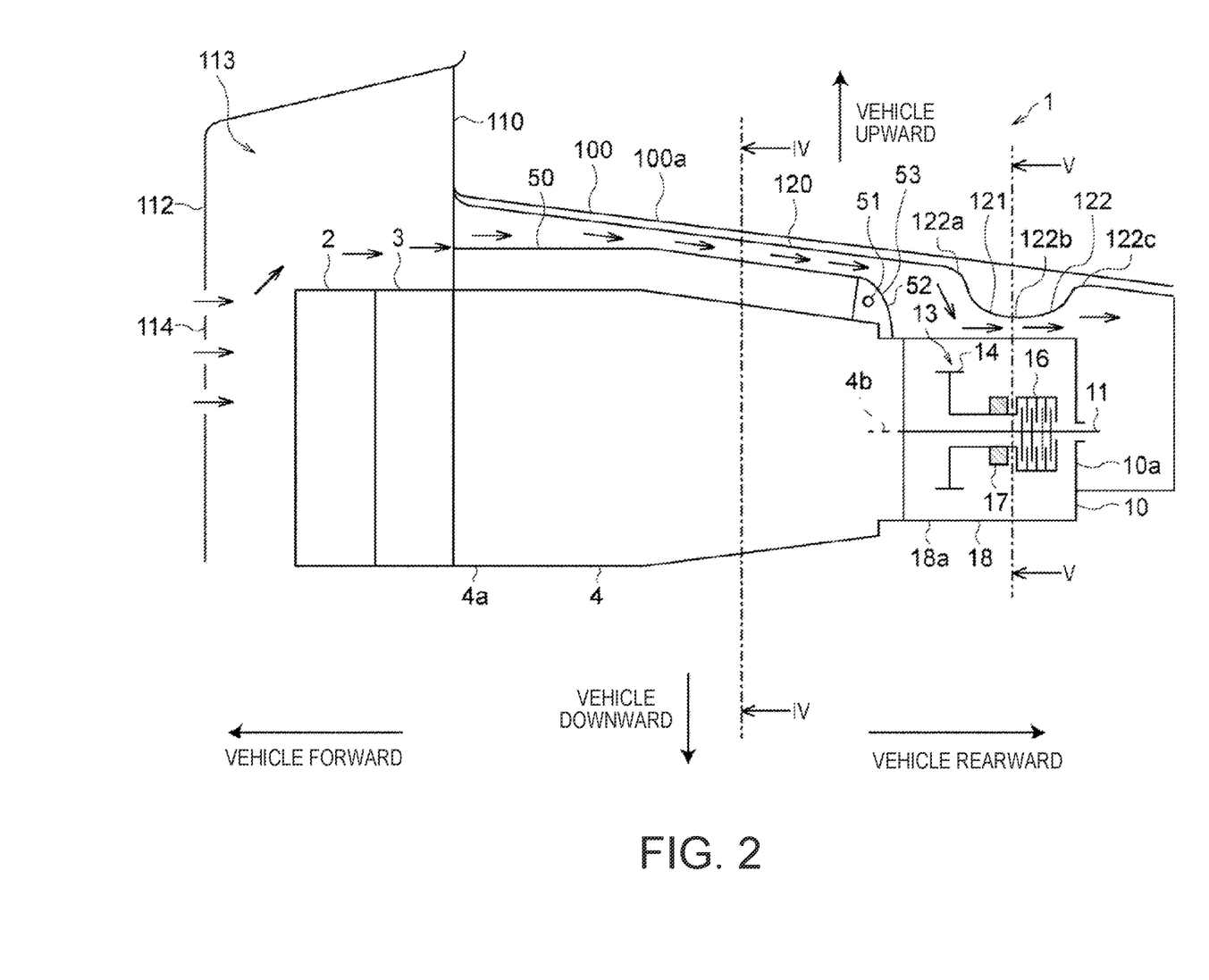
FIG. 2 is a cross-sectional view schematically illustrating a transfer cooling structure of the 4WD vehicle when taken along a line II-II of FIG. 1.

FIG. 2 is a cross-sectional view schematically illustrating a transfer cooling structure of the 4WD vehicle 1 when taken along a line II-II of FIG. 1. As illustrated in FIG. 2, an inverter 50 which converts direct current from a battery to alternating current and drives the motor 3 is disposed above the transmission 4 near the motor 3. The inverter 50 is connected, at its rear side, to a harness 51 connected to each of the battery and the motor 3, and a rectifying cover 52 extending rearwardly is disposed to cover the harness 51. The rectifying cover 52 is formed to have a curved surface 53 which inclines gradually downwardly to the rear side, and both sides of the curved surface 53 in a vehicle-width direction extend in a direction perpendicular to the vehicle-width direction along both sides of the inverter 50 in the vehicle-width direction.

A floor 100 as a floor surface inside a cabin of the 4WD vehicle 1 is disposed above a transmission case 4a of the transmission 4 and a transfer case 10a of the transfer device 10. The floor 100 is provided with a tunnel part 100a which extends in the front-and-rear direction along the transmission 4 and the transfer device 10, and is concaved upwardly so as to cover the transmission case 4a and the inverter 50, and the transfer case 10a from above.

Further, the floor 100 is coupled, at the front side, with a dash panel 110 which extends upwardly to define the cabin and an engine bay 113. Referring to FIG. 1, both of left and right sides of the dash panel 110 in the vehicle-width direction are coupled to front side panels 111a and 111b extending forwardly, respectively. The front side panels 111a and 111b are coupled, at the front side, with a front bumper 112 extending to the left and right sides in the vehicle-width direction. The engine 2 and the motor 3 of the 4WD vehicle 1 are disposed in the engine bay 113 surrounded by the front side panels 111a and 111b and the front bumper 112.

Referring to FIG. 2, the front bumper 112 is provided, at its substantially center in the vehicle-width direction, with a front grill 114 having a plurality of openings. The front grill 114 takes traveling air into the engine bay 113 from forward when the 4WD vehicle 1 travels.

The 4WD vehicle 1 is provided, at below the tunnel part 100a of the floor 100, with an insulator 120 so as to cover the transmission case 4a and the inverter 50, and the transfer case 10a while having a gap with respect to them. The insulator 120 is made of a plate-like member and attached to the floor 100 by a bolt(s) (screw(s)) and a clip(s), and reduces noise caused by the transmission 4 and the transfer device 10 during the traveling of the 4WD vehicle 1.

Figure 3:
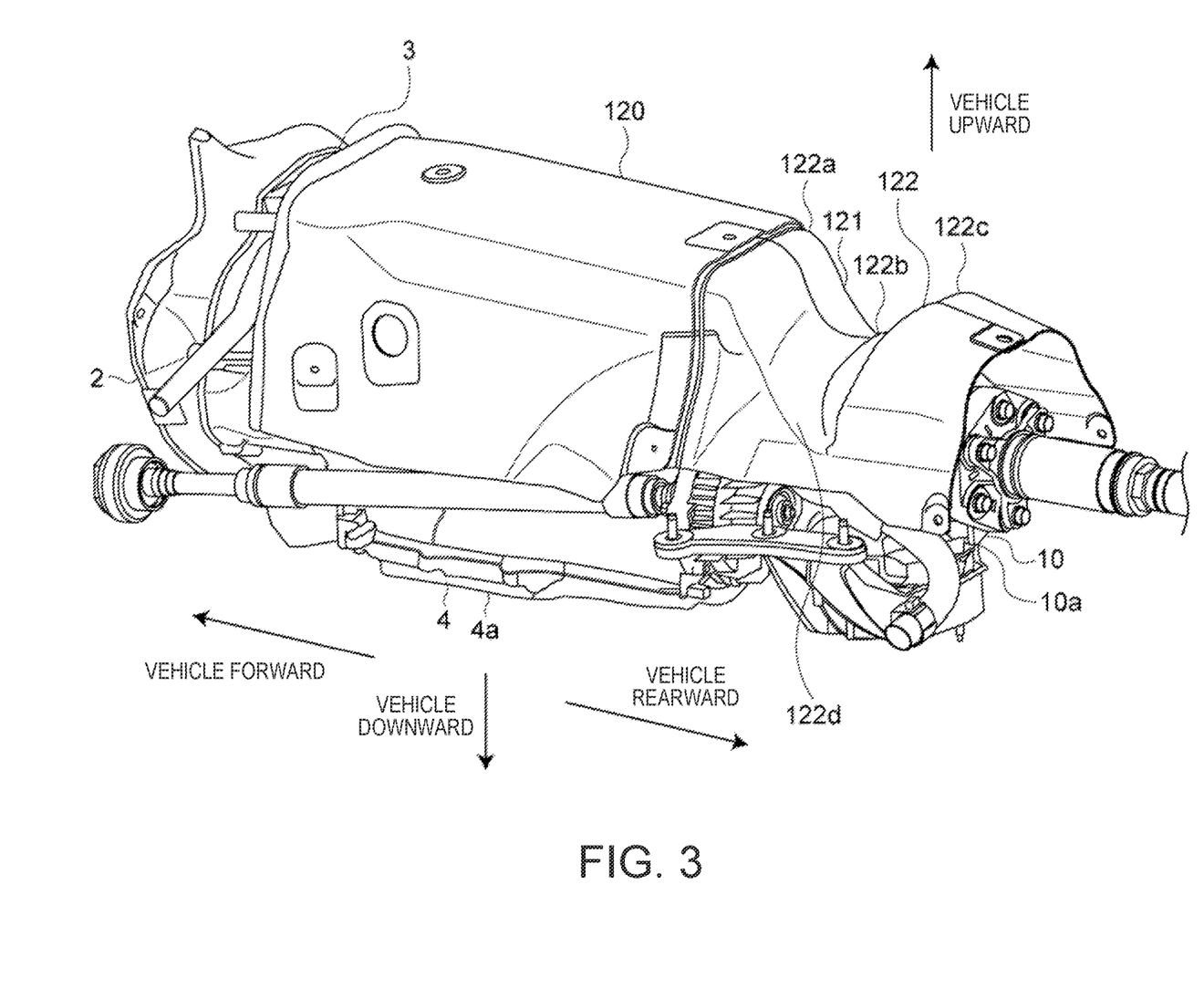
FIG. 3 is a schematic diagram illustrating an insulator of the transfer cooling structure illustrated in FIG. 2.

FIG. 3 is a schematic diagram illustrating the insulator 120 of the transfer cooling structure illustrated in FIG. 2. As illustrated in FIG. 3, the insulator 120 has a shape extending in the front-and-rear direction along the transmission case 4a and the transfer case 10a, and protruding upwardly from below so as to cover above and left and right sides of the transmission case 4a and the transfer case 10a.

Referring to FIG. 1, the transfer device 10 includes, as a main-drive-wheel output shaft, a rear-wheel output shaft 11 coupled to an output shaft 4b of the transmission 4 and extending rearwardly (one side in the vehicle front-and-rear direction), as an auxiliary-drive-wheel output shaft, a front-wheel output shaft 12 disposed in parallel with the rear-wheel output shaft 11, and a powertrain mechanism 13 which transmits the driving force extracted from the rear-wheel output shaft 11 to the front-wheel output shaft 12.

Further, the transfer device 10 includes a coupling provided on the rear-wheel output shaft 11 and having a torque-distribution-control friction clutch 16 coupled to the rear-wheel output shaft 11 to extract the driving force for the front wheels from the driving force transmitted to the rear-wheel output shaft 11. The torque-distribution-control friction clutch 16 is controlled through energization control of a solenoid by a control unit (not illustrated).

The powertrain mechanism 13 is a gear type, and includes a drive gear 14 which is provided to the front side of the torque-distribution-control friction clutch 16 on the rear-wheel output shaft 11 so as to be coupled to the torque-distribution-control friction clutch 16, and a driven gear 15 which is provided on the front-wheel output shaft 12 and coupled thereto to mesh with the drive gear 14. The powertrain mechanism 13 transmits the front-wheel driving force, which is extracted from the rear-wheel output shaft 11 by the torque-distribution-control friction clutch 16, to the front-wheel output shaft 12.

A front-wheel propeller shaft 30 extending forwardly is coupled to a front end part of the front-wheel output shaft 12. The front-wheel propeller shaft 30 has a universal joint 31 at its rear end part, and is coupled to the front-wheel output shaft 12 via the universal joint 31.

The front-wheel propeller shaft 30 also includes a universal joint 32 at its front end part, and is coupled to an input shaft 41 of a front-wheel differential gear 40 via the universal joint 32. The input shaft 41 of the front-wheel differential gear 40 is coupled to an axle 42 which is coupled to each of the left and right front wheels.

Accordingly, the front-wheel driving force extracted from the rear-wheel output shaft 11 by the torque-distribution-control friction clutch 16 is transmitted to the front-wheel output shaft 12 via the powertrain mechanism 13, and then transmitted from the front-wheel output shaft 12 to the front wheels via the front-wheel propeller shaft 30 and the front-wheel differential gear 40.

In the 4WD vehicle 1, the torque-distribution-control friction clutch 16 extracts the front-wheel driving force while changing a front/rear torque distribution ratio of the front wheels to the rear wheels within a range from 0:100 to 50:50. Note that operation of the torque-distribution-control friction clutch 16 is controlled by a control unit (not illustrated).

The transfer device 10 also includes a damper 17 on the rear-wheel output shaft 11 between the torque-distribution-control friction clutch 16 and the drive gear 14. The damper 17 lowers a resonance frequency at which the drive system on the front-wheel side from the torque-distribution-control friction clutch 16 to the front wheels via the drive gear 14, the driven gear 15, the front-wheel output shaft 12, the front-wheel propeller shaft 30, and the front-wheel differential gear 40 resonates with a torque vibration of the engine 2, to be below a practical range.

Next, the insulator 120 of the transfer cooling structure is described in more detail.

Referring to FIG. 2, the insulator 120 is provided with a cooling acceleration part 121 which is located to be in agreement with the torque-distribution-control friction clutch 16 of the transfer device 10 in the front-and-rear direction, extends in the front-and-rear direction along the transfer case 10a, and protrudes toward the transfer case 10a from the floor 100 side. The cooling acceleration part 121 is provided to overlap with the torque-distribution-control friction clutch 16 in the front-and-rear direction.

As illustrated in FIGS. 2 and 3, the cooling acceleration part 121 has a substantially U-shaped curved surface 122 extending in the front-and-rear direction. The curved surface 122 curves downwardly in an arc shape from a front end part 122a to a central part 122b of the curved surface 122 in the front-and-rear direction so that a gap with respect to the transfer case 10a is gradually reduced. On the other side, the curved surface 122 curves upwardly in an arc shape from the central part 122b to a rear end part 122c of the curved surface 122 so that the gap with respect to the transfer case 10a is gradually increased. Further, the curved surface 122 has, at the central part 122b, an arc part 122d protruding upward when seen in the vehicle-width direction so as to conform to the shape of the insulator 120 which protrudes upward to cover above and left and right sides of the transfer case 10a.

As described above, the insulator 120 is disposed to cover the transmission case 4a and the inverter 50, and the transfer case 10a while having the gap with respect to them. Particularly, the gap between the insulator 120 and the transfer case 10a is the smallest at the cooling acceleration part 121. In this embodiment, the gap between the insulator 120 and the transfer case 10a is the smallest at the cooling acceleration part 121, and the gap is set to, but not limited to, about 30 mm. Further, a gap between the insulator 120 and a rear-end part of the inverter 50 is, but not limited to be, equal to the gap between the cooling acceleration part 121 and the transfer case 10a.

Figure 4:
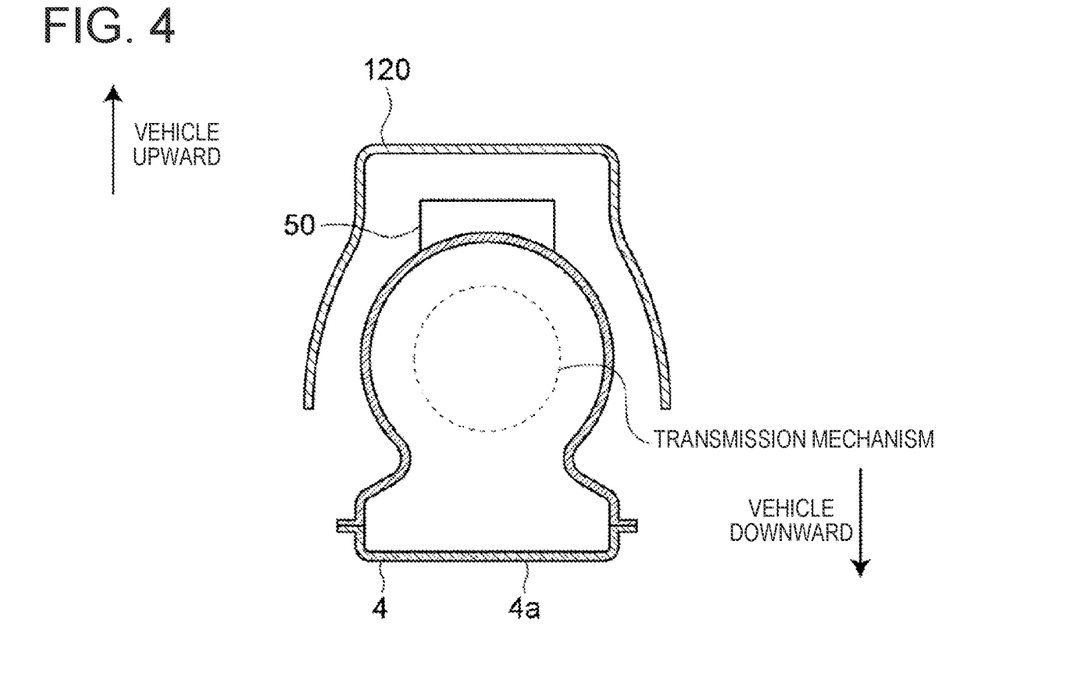
FIG. 4 is a cross-sectional view schematically illustrating the insulator and a transmission when taken along a line IV-IV of FIG. 2.

FIG. 4 is a cross-sectional view schematically illustrating the insulator 120 and the transmission 4 when taken along a line Iv-Iv of FIG. 2. As illustrated in FIG. 4, the gap between the insulator 120 and the inverter 50 disposed above the transmission case 4a, is formed on both of the left and right sides in the vehicle-width direction.

Figure 5:
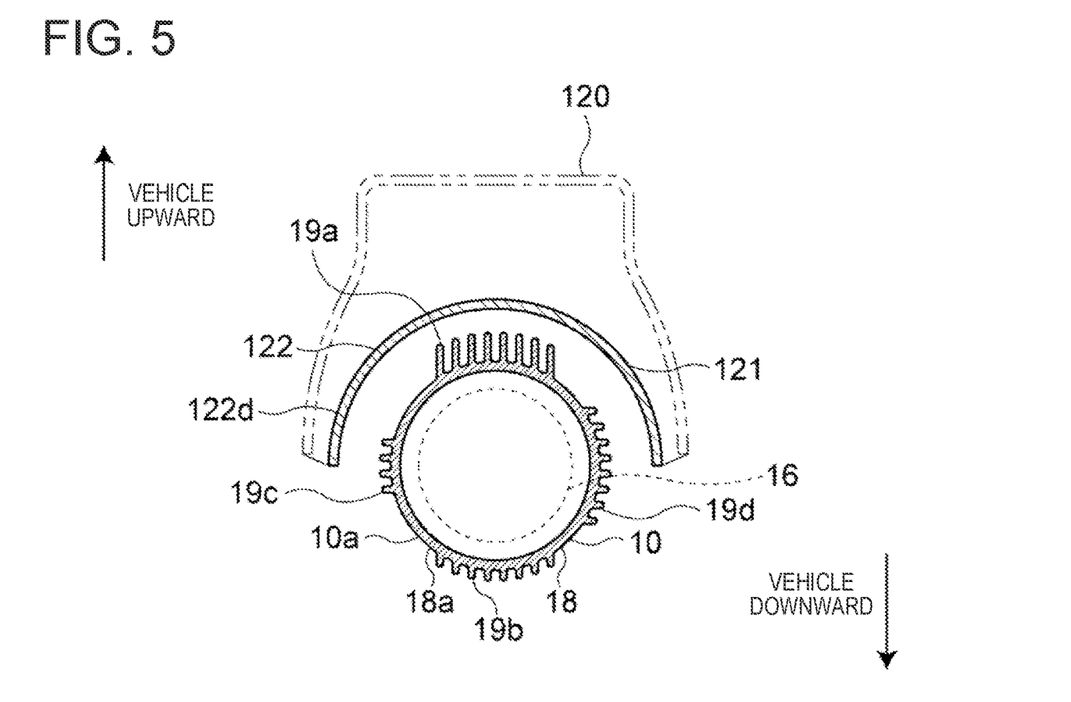
FIG. 5 is a cross-sectional view schematically illustrating the insulator and the transfer device when taken along a line V-V of FIG. 2.

FIG. 5 is a cross-sectional view schematically illustrating the insulator 120 and the transfer device 10 when taken along a line v-v of FIG. 2. As illustrated in FIG. 5, the gap between the insulator 120 and the transfer case 10a is formed along the insulator 120 which covers above and left and right sides of the transfer case 10a.

Referring to FIG. 2, since the insulator 120 is disposed to cover the transmission case 4a and the inverter 50, and the transfer case 10a while having the gap with respect to them, when the 4WD vehicle 1 travels, as indicated by arrows, traveling air taken into the engine bay 113 through the front grill 114 flows through the gap between the insulator 120 and the transmission case 4a at the front side of the transmission case 4a. The traveling air flowing through the gap between the insulator 120 and the transmission case 4a passes through the gap between the insulator 120 and the inverter 50, and then, is rectified toward the transfer case 10a at the rectifying cover 52 disposed at the rearward of the inverter 50.

As described above, the traveling air rectified toward the transfer case 10a flows through the gap between the cooling acceleration part 121 of the insulator 120 and the transfer case 10a. Since the cooling acceleration part 121 protrudes toward the transfer case 10a from the floor 100 side, the gap between the insulator 120 and the transfer case 10a becomes smaller, and a flow rate of the traveling air flowing through the gap increases. By the increase in the flow rate of the traveling air flowing through the gap between the cooling acceleration part 121 of the insulator 120 and the transfer case 10a, the transfer case 10a, particularly, a part of the transfer case 10a where the torque-distribution-control friction clutch 16 is accommodated, is largely cooled. The traveling air flowed through the gap between the cooling acceleration part 121 of the insulator 120 and the transfer case 10a is discharged rearwardly.

Next, the transfer case 10a is described in more detail.

Figure 6:
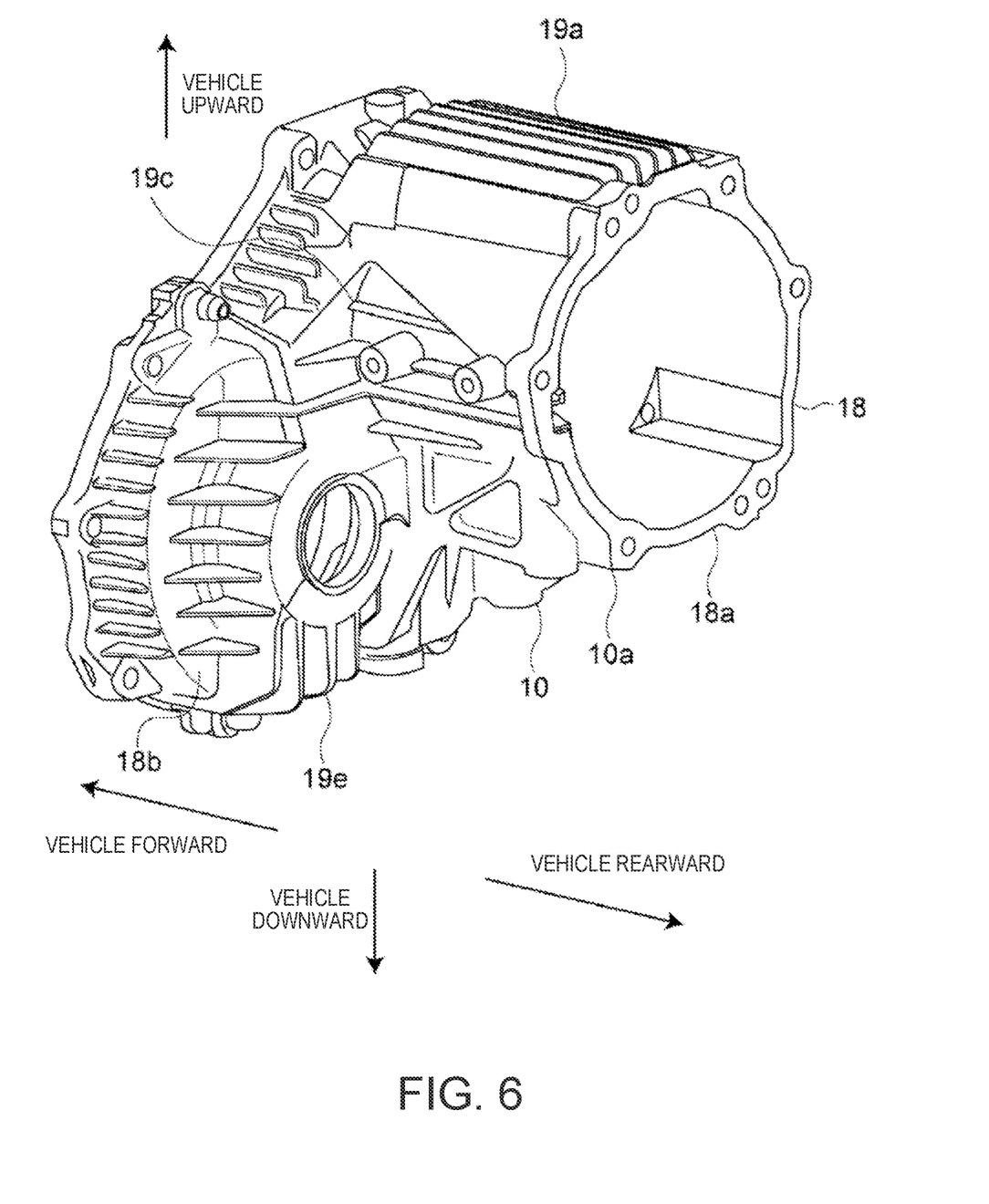
FIG. 6 is a schematic diagram of a transfer case of the transfer device illustrated in FIG. 1 when seen from a left side in a vehicle-width direction.

FIG. 6 is a schematic diagram of the transfer case 10a of the transfer device 10 illustrated in FIG. 1 when seen from the left side in the vehicle-width direction. The transfer case 10a includes a case body 18, a front cover which covers a front side of the case body 18, and a rear cover which covers a rear side of the case body 18, and these components are fixed to each other by a bolt(s) (screw(s)). The case body 18 includes a cylindrical part 18a extending substantially cylindrically in an axial direction of the rear-wheel output shaft 11, and a vertical wall part 18b extending from the cylindrical part 18a in a direction perpendicular to an axial direction of the front-wheel output shaft 12, and the torque-distribution-control friction clutch 16 is accommodated inside the cylindrical part 18a.

Outside of the cylindrical part 18 (in detail, an upper part, a lower part, a left part, and a right part), fins extending in the front-and-rear direction are provided. Referring to FIG. 5, upper fins 19a provided to the upper part of the cylindrical part 18a extend in a direction perpendicular to the vehicle-width direction and in parallel with the rear-wheel output shaft 11. The upper fins 19a are formed to be taller in height compared to lower fins 19b provided to the lower part of the cylindrical part 18a, left fins 19c provided to the left part of the cylindrical part 18a, and right fins 19d provided to the right part of the cylindrical part 18a. Further, referring to FIG. 6, the vertical wall part 18b is also provided with vertical wall part fins 19e extending in the front-and-rear direction, and the upper fins 19a are formed to be taller in height compared to the vertical wall part fins 19e.

Figure 7:
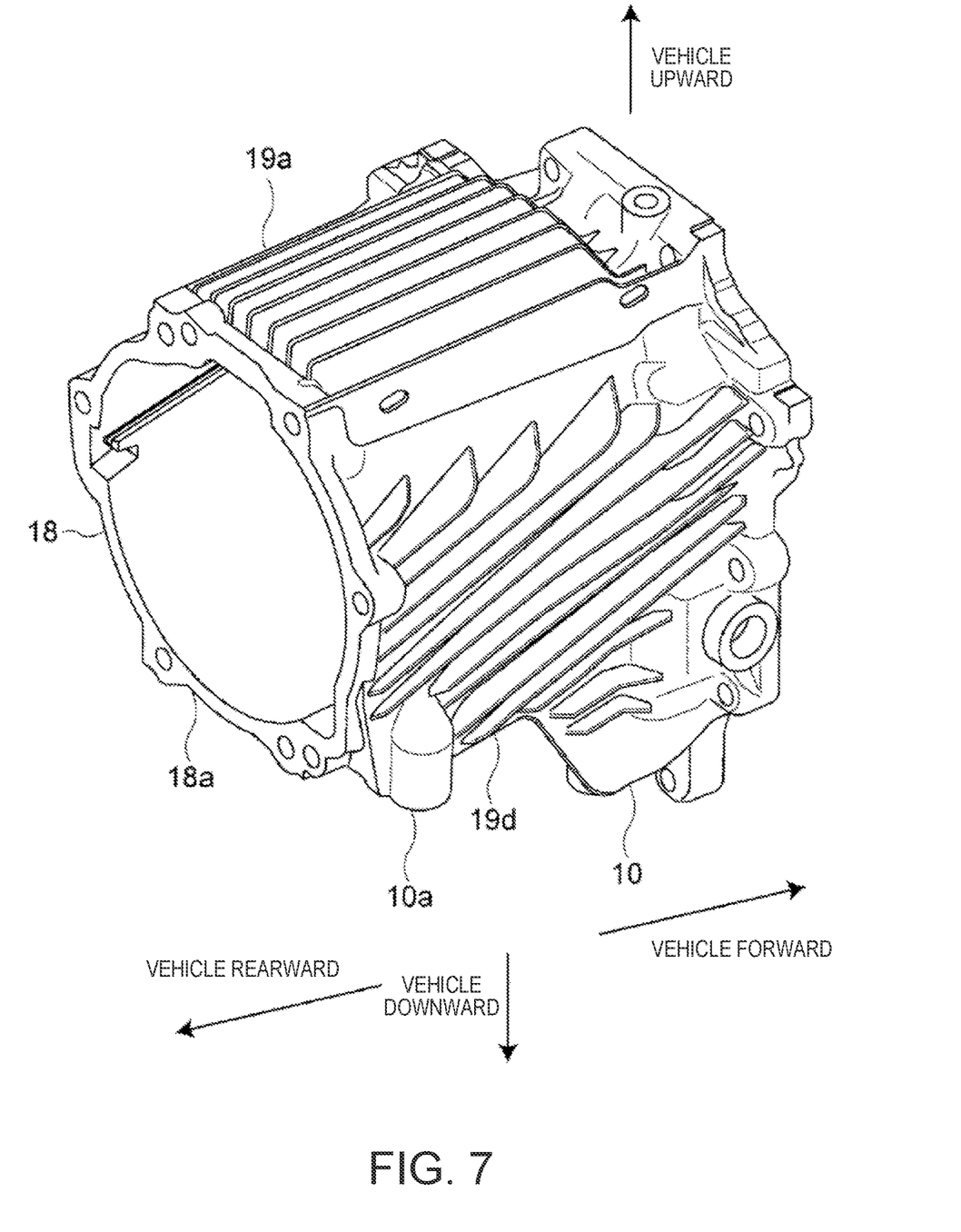
FIG. 7 is a schematic diagram of the transfer case of the transfer device illustrated in FIG. 1 when seen from a right side in the vehicle-width direction.

FIG. 7 is a schematic diagram of the transfer case 10a of the transfer device 10 illustrated in FIG. 1 when seen from the right side. As illustrated in FIG. 7, the right fins 19d provided on the right side incline downwardly to the rear side.

Since the upper fins 19a provided to the upper part of the transfer case 10a are formed to have the taller height compared to the fins provided to the other parts of the transfer case 10a, surface areas thereof are large. Therefore, as described above, when traveling air flows through the gap between the cooling acceleration part 121 of the insulator 120 and the transfer case 10a, a heat dissipation effect increases, and thus, a cooling effect of the transfer case 10a, particularly, of the cylindrical part 18a of the transfer case 10a where the torque-distribution-control friction clutch 16 is accommodated, is enhanced.

As described above, in the transfer cooling structure according to this embodiment, the insulator 120 provided to cover the transmission case 4a of the transmission 4 and the transfer case 10a of the transfer device 10 while having the gap with respect to them, is attached to below the tunnel part 100a of the floor 100. The insulator 120 is provided with the cooling acceleration part 121 protruding toward the transfer case 10a from the floor 100 side.

According to this, the cooling acceleration part 121 increases the flow rate of traveling air which is taken-in from forward of the 4WD vehicle 1 and flows through between the transmission case 4a and the insulator 120, and then between the transfer case 10a and the insulator 120. Therefore, a cooling performance of the transfer device 10 provided with the torque-distribution-control friction clutch 16 is improved. Further, with the simple configuration of changing the shape of the part of the insulator 120 which is provided to reduce noise caused by the transmission 4 and the transfer device 10, the cooling performance of the transfer device 10 can be improved.

Further, by the gap between the insulator 120, and the transmission case 4a and the transfer case 10a being the smallest at the cooling acceleration part 121, the cooling performance of the transfer device 10 can be further improved.

Further, since the inverter 50 is provided above the transmission case 4a, and the rectifying cover 52 is provided at the rear part of the inverter 50, traveling air which flows between the transmission 4 and the insulator 120 is rectified to flow through between the transfer case 10a and the cooling acceleration part 121 of the insulator 120, thus the transfer device 10 being cooled. Therefore, a power transmission performance of the 4WD vehicle 1 as a hybrid vehicle can be improved. Moreover, also when the harness 51, etc., is disposed rearward of the inverter 50, by providing the rectifying cover 52 to cover the harness 51, generation of turbulence in the traveling air is suppressed, and the cooling of the transfer device 10 is facilitated.

Further, the plurality of fins 19a, 19b, 19c, 19d, and 19e are provided to the outside of the transfer case 10a, and the upper fins 19a provided to the upper part of the transfer case 10a are formed to have the taller height compared to the fins 19b, 19c, 19d, and 19e provided to the other parts of the transfer case 10a. Therefore, the surface areas of the upper fins 19a become larger, and the heat dissipation effect increases, and the cooling effect of the transfer device 10 provided with the torque-distribution-control friction clutch 16 is enhanced.

Although in this embodiment the gap between the insulator 120 and the transfer case 10a is the smallest at the cooling acceleration part 121, and the gap with respect to the rear-end part of the inverter 50 is also equal to the gap between the cooling acceleration part 121 and the transfer case 10a, only the gap between the cooling acceleration part 121 and the transfer case 10a may be further smaller.

Although in this embodiment the 4WD vehicle 1 is the hybrid 4WD vehicle, it may be a 4WD vehicle having only the engine 2 as a power source. In this case, instead of the inverter 50, another member may be disposed above the transmission case 4a. Alternatively, another member may not be disposed above the transmission case 4a.

Although in this embodiment the inverter 50 is disposed above the transmission case 4a, it may be attached to another location, such as on a side surface of the transmission case 4a.

In this embodiment, the transfer case 10a is cooled by traveling air flowing through the gap between the insulator 120, and the transmission case 4a and the transfer case 10a. Therefore, unlike a case where hole(s) is formed in an undercover provided below the engine 2, the motor 3, and the transmission 4 in order to cool the engine 2, the motor 3, and the transmission 4, a flow of air below the undercover is not affected.

The present disclosure is not limited by the illustrated embodiment, but various improvements and changes in design are possible without departing from the spirit of the present disclosure.

As described above, according to the present disclosure, in the transfer cooling structure of the 4WD vehicle in which the power source, the transmission, the transfer device provided with the torque-distribution-control friction clutch are disposed in this order from forward of the vehicle, the torque-distribution-control friction clutch of the transfer device can be cooled with the simple configuration, and thereby, the present disclosure may suitably be used in this type of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 4WD Vehicle
2 Engine
3 Motor
4 Transmission
4a Transmission Case
10 Transfer Device
10a Transfer Case
16 Torque-distribution-control Friction Clutch
100 Floor
100a Tunnel Part
120 Insulator
121 Cooling Acceleration Part

What is claimed is:

1. A transfer cooling structure of a vehicle including a power source, a transmission, and a transfer device provided with a torque-distribution-control friction clutch, disposed in order from a forward side of the vehicle to a rearward side of the vehicle, the transfer cooling structure comprising:
    a floor provided in the vehicle and the floor having a tunnel part configured to cover a transmission case of the transmission and a transfer case of the transfer device from above the transmission case and the transfer case;
    an insulator attached below the tunnel part of the floor to cover the transmission case and the transfer case, while having a gap between the insulator and the transmission case and the transfer case; and
    wherein the insulator has a cooling acceleration part protruding toward the transfer case from a floor side of the insulator.

2. The structure of claim 1, wherein the gap between the insulator, and the transmission case and the transfer case is the smallest at the cooling acceleration part.

3. The structure of claim 2,
    wherein a given member is provided above the transmission case, and
    wherein a rectifying cover is provided at a rear part of the given member.

4. The structure of claim 3, wherein the power source includes a motor, and the given member includes an inverter.

5. The structure of claim 4,
    wherein a plurality of fins are provided to outside of the transfer case, and
    wherein a fin of the plurality of fins provided to an upper part of the transfer case has a taller height compared to fins of the plurality of fins provided to other parts of the transfer case.

6. The structure of claim 1,
    wherein a given member is provided above the transmission case, and
    wherein a rectifying cover is provided at a rear part of the given member.

7. The structure of claim 6, wherein the power source includes a motor, and the given member includes an inverter.

8. The structure of claim 1,
    wherein a plurality of fins are provided to outside of the transfer case, and
    wherein a fin of the plurality of fins provided to an upper part of the transfer case has a taller height compared to fins of the plurality of fins provided to other parts of the transfer case.

9. The structure of claim 2,
    wherein a plurality of fins are provided to outside of the transfer case, and
    wherein a fin of the plurality of fins provided to an upper part of the transfer case has a taller height compared to fins of the plurality of fins provided to other parts of the transfer case.

10. The structure of claim 3,
    wherein a plurality of fins are provided to outside of the transfer case, and
    wherein a fin of the plurality of fins provided to an upper part of the transfer case has a taller height compared to fins of the plurality of fins provided to other parts of the transfer case.

11. The structure of claim 6,
    wherein a plurality of fins are provided to outside of the transfer case, and
    wherein a fin of the plurality of fins provided to an upper part of the transfer case has a taller height compared to fins of the plurality of fins provided to other parts of the transfer case.

12. The structure of claim 7,
    wherein a plurality of fins are provided to outside of the transfer case, and
    wherein a fin of the plurality of fins provided to an upper part of the transfer case has a taller height compared to fins of the plurality of fins provided to other parts of the transfer case.

13. The structure of claim 1, wherein the cooling acceleration part includes a substantially U-shaped curved surface extending in a front-and-rear direction of a vehicle body.

14. The structure of claim 13, wherein the curved surface curves downwardly in an arc shape from a front end part to a central part of the curved surface in the front-and-rear direction so that the gap with respect to the transfer case is gradually reduced, and curves upwardly in an arc shape from the central part to a rear end part of the curved surface so that the gap with respect to the transfer case is gradually increased.

15. The structure of claim 13, wherein the curved surface includes at the central part an arc part protruding upwardly in a vehicle-width direction so as to conform to the shape of the insulator protruding upwardly to cover above and left and right sides of the transfer case.

16. The structure of claim 5,
    wherein the plurality of fins extend in a front-and-rear direction of the vehicle and are provided to an upper part, a lower part, a left part, and a right part of a cylindrical part of a transfer case body of the transfer device, and
    wherein the fins provided to the upper part extend perpendicular to a vehicle-width direction, and are formed to have a taller height compared to the fins provided to the lower part, the fins provided to the left part, and the fins provided to the right part.

17. The structure of claim 8,
    wherein the plurality of fins extend in a front-and-rear direction of the vehicle and are provided to an upper part, a lower part, a left part, and a right part of a cylindrical part of a transfer case body of the transfer device, and wherein the fins provided to the upper part extend perpendicular to a vehicle-width direction, and are formed to have a taller height compared to the fins provided to the lower part, the fins provided to the left part, and the fins provided to the right part.

* * * * *